Figure 1:
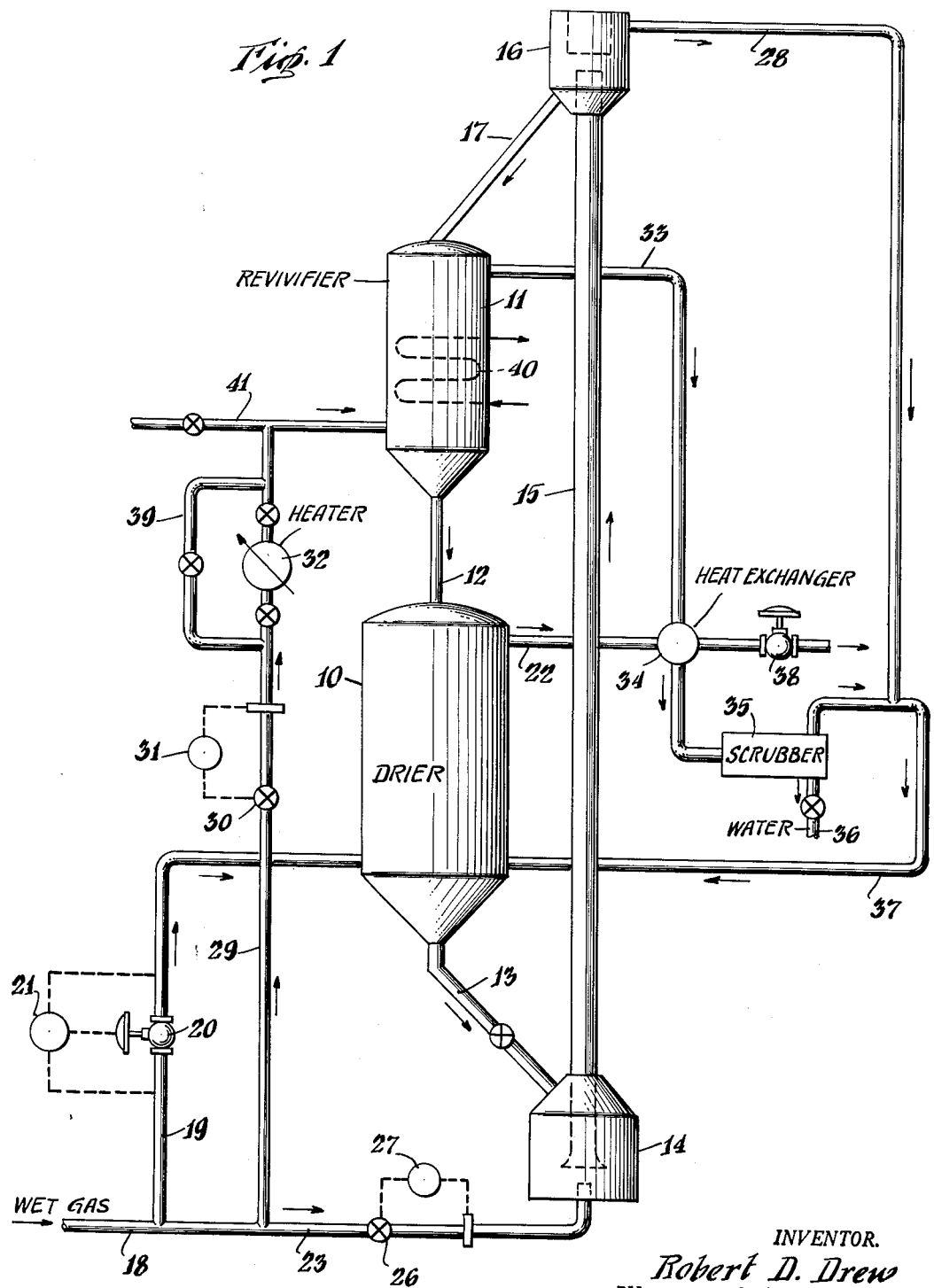

March 20, 1956 — R. D. DREW — 2,738,858
CONTINUOUS GAS DEHUMIDIFICATION PROCESS
Filed Oct. 23, 1952 — 3 Sheets-Sheet 1

INVENTOR.
Robert D. Drew
BY Andrew L. Gaboriault
AGENT

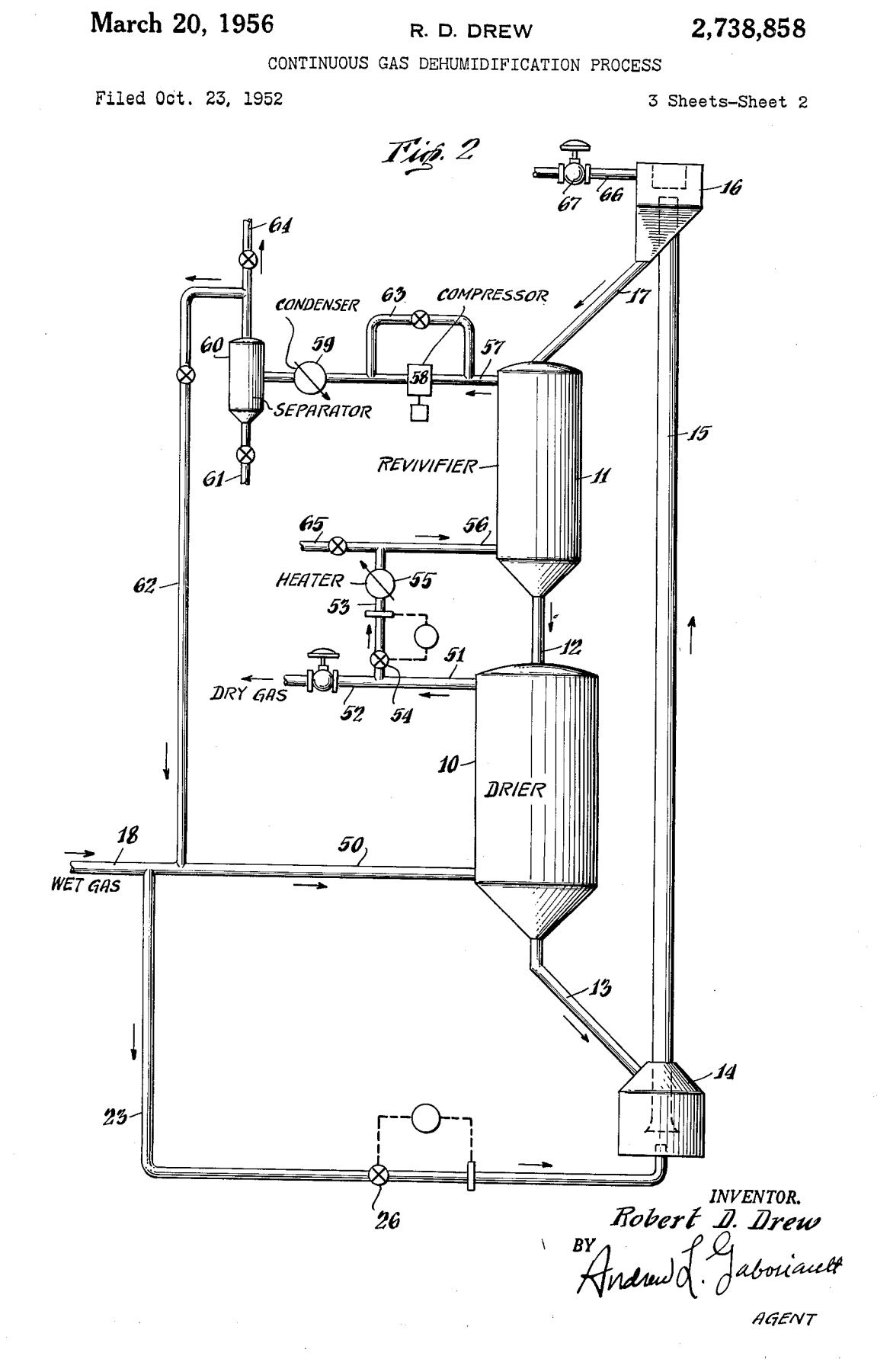

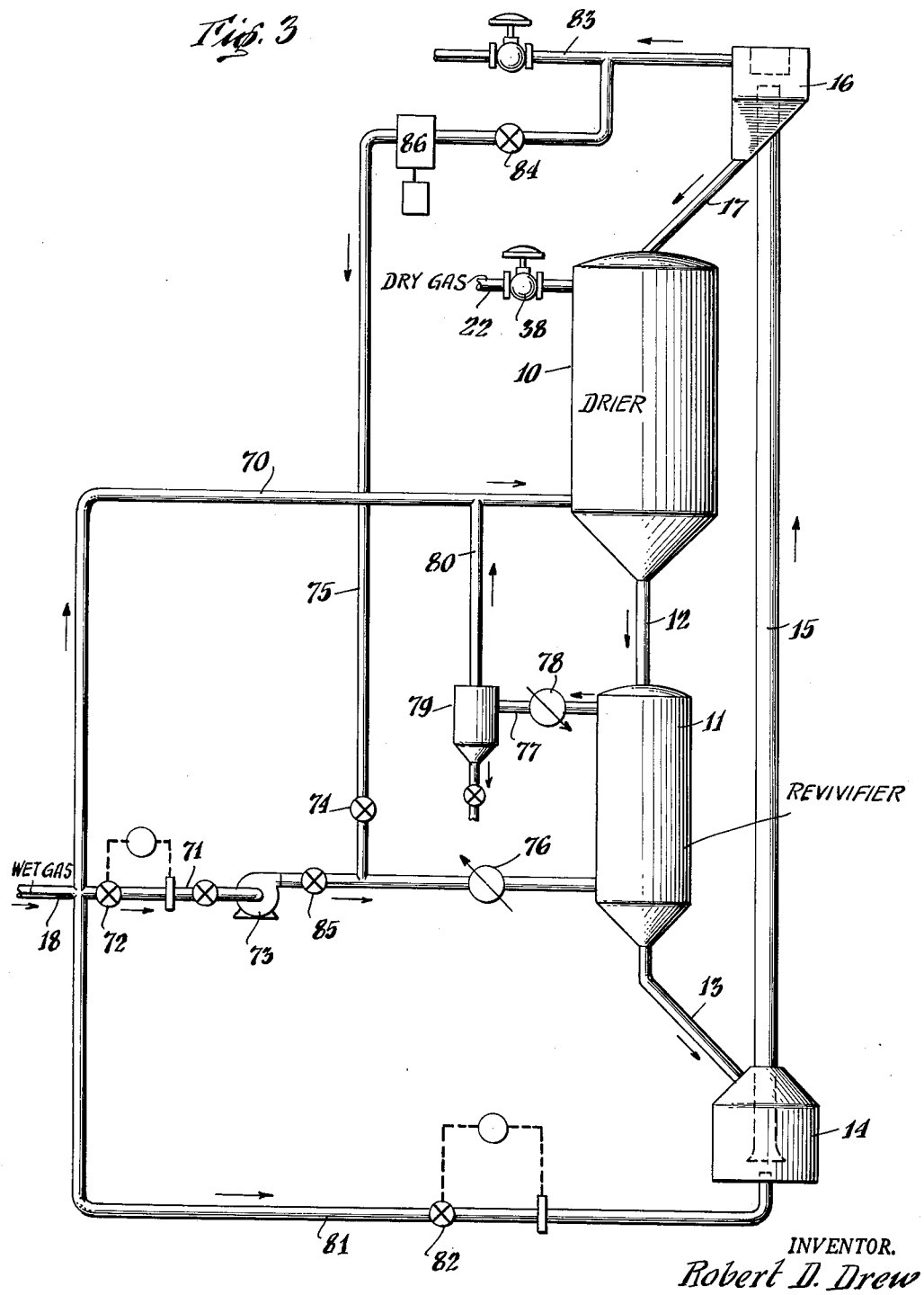

United States Patent Office 2,738,858
Patented Mar. 20, 1956

2,738,858
CONTINUOUS GAS DEHUMIDIFICATION PROCESS

Robert D. Drew, Wenonah, N. J., assignor to Socony Mobil Oil Company, Inc., a corporation of New York Application October 23, 1952, Serial No. 316,456

1 Claim. (Cl. 183—114.2)

This invention relates to a method for removing moisture from a gasiform stream continuously by means of a granular solid desiccant. In a more specific aspect it deals with the operation of such a gas dehumidification process so as to avoid the necessity of providing for external means for cooling the desiccant before it is supplied to the gas drying zone or while in the drying zone. This invention is particularly applicable to the drying of gaseous petroleum fractions such as natural gas.

Suitable desiccants for use in this process include bauxite, activated alumina and inorganic oxide gels comprised predominantly of silica or in some instances alumina, and having a high capacity to adsorb moisture over a wide range of relative humidities. The desiccant should be of palpable particulate form as distinguished from finely divided powder, and should generally be within the size range 2 to 100 mesh and preferably 4 to 8 mesh by Tyler standard screen analysis. The term "granular" is used herein in describing and claiming this invention to include any desiccant of palpable particulate form, like those of the above sizes. The desiccant may take the shape of pellets, tablets, spheres, capsules, and the like, or it may be of irregular shape, such as is obtained from grinding and screening operations.

The usual continuous gas dehydration process employing a granular desiccant, cycles the desiccant continuously between a drying zone and revivification zone. In the drying zone the desiccant is maintained as a downwardly gravitating, substantially compact bed at a temperature suitable for the desired degree of dehumidification. Wet gas charge is passed upwardly through the bed to effect removal of moisture by adsorption and condensation on the desiccant. The moisture-laden desiccant is then passed to the revivification zone where it is heated to a temperature at which the moisture it bears will vaporize and the moisture is stripped from it. The hot, dried desiccant is then cooled by use of an externally supplied coolant to a suitable dehumidification temperature and then returned to the drying zone. This cooling step is disadvantageous because the refrigeration required results in considerable added expense to the process costs. Also, the cooler itself is expensive and its use add to the height of the dehumidification unit and, therefore, adds to construction costs.

An object of this invention is to provide a continuous, efficient, economical process for dehumidifying or dehydrating gas streams.

This and other objects of this invention will be apparent from the following discussion of the invention.

Before proceeding with this discussion certain terms used in describing and claiming this invention will be defined. The terms "gas," "gasiform," and the like, are used herein to refer to a material in the gaseous phase under the existing conditions of temperature and pressure, regardless of what may be its phase under normal atmospheric conditions. The term "specific heat capacity" of a stream is used herein to refer to the product of the flow rate of the stream in weight per unit time, such as pounds per hour, and the specific heat of the material in heat per unit weight per unit temperature rise, such as British thermal units per pound per ° F. Thus, the specific heat capacity will have the units, heat per unit time per unit temperature, which in the English system would be British thermal units per hour per ° F. The term "dry gas," and like terms, when applied to the gas product of the dehumidification process, are used herein merely to denote a gas which has been dehumidified to the desired extent and are not used in the limited sense as referring only to a gas completely devoid of moisture.

In the process of this invention, the hot, dried desiccant from the revivification zone is supplied directly to the upper end of a bed of desiccant in the drying zone. Wet gas is supplied to the lower section of this bed and passed upwardly therethrough to be dehumidified at a rate, relative to the rate of supply of hot desiccant to the drying zone, sufficiently high to effect a substantial amount of the required cooling of the desiccant from the revivification temperature to a temperature suitable for removing moisture from the gas within about 2 to 12 inches of the upper surface of the desiccant bed, so that beneath this distance of the upper surface the desiccant bed will be adsorbing moisture from the gas stream.

This invention will be best understood by reference to the attached drawings, of which Figure 1 is an elevational view, illustrating the application of one form of this invention to the dehydration of petroleum natural gas, Figure 2 is an elevational view, illustrating a second form which this invention may take, and Figure 3 is an elevational view, showing the application of a third form of this invention to the dehydration of petroleum natural gas.

All of these drawings are highly diagrammatic in form and like parts in all bear like numerals.

In discussing these drawings, reference will be made to specific pressures and temperatures at various points in the system. These values are given only to aid in the understanding of the invention and the drawings, and it is not intended to in any way limit the invention by these specific values.

Turning to Figure 1, there is shown therein a drier 10 and revivifier 11 thereabove. Conduit 12 extends from the bottom of revivifier 11 into the top of drier 10. Conduit 13 extends from the bottom of drier 10 into a lift tank 14. Lift pipe 15 extends from an intermediate level in tank 14 vertically upwardly to an intermediate level within separator 16 positioned on a vertical level above the upper end of revivifier 11. Conduit 17 extends downwardly from separator 16 into the upper end of vessel 11.

In one operation of this system, wet petroleum natural gas is supplied to the process through passage 18. Typically, this gas might be at 900 pounds per square inch gauge and 96° F. The wet gas charge is split into three portions. A major portion of the charge passes upwardly directly into the lower section of the drying zone within drier 10 through conduit 19. Before being supplied to the drying zone, however, the pressure of the gas in passage 19 is reduced to a level below that maintained in revivifier 11 by use of diaphragm valve 20 operated by differential pressure controller 21. The pressure on the downstream side of valve 20 might be about 886 pounds per square inch gauge, so that wet gas would be supplied to the lower section of drying zone 10 and to the bed of desiccant therein at 886 pounds per square inch gauge and 96° F. The selection of the pressure for supply to the drier is controlled by operations in the revivifier as explained hereinbelow. A downwardly gravitating, substantially compact bed of granular desiccant is maintained within drying zone 10 and the wet gas passes upwardly therethrough to effect dehumidification of the gas by adsorption and condensation of the moisture from the wet gas on the desiccant in the bed. Dry gas is removed from the upper section of drying zone 10 through conduit 22 at a pressure of about 884 pounds per square inch gauge and at about 100° F. Moisture-laden desiccant is removed from the lower section of drying zone 10 and gravitated through passage 13 into lift tank 14. A minor portion of the wet gas charge passes through conduit 23 into the lower end of lift tank 14. The rate of supply of wet gas to tank 14 is controlled by valve 26 in response to flow rate controller 27 to obtain the proper desiccant circulation rate through the cyclic system. The pressure in tank 14 will be about 888 pounds per square inch gauge. In tank 14 moisture-laden desiccant is suspended in the gas from passage 23 and the suspension then passed up through lift pipe 15 into separator 16. In the separator the granular desiccant drops out of the lift gas and is gravitated downwardly into the upper section of the revivification zone 11 through passage 17. Lift gas is removed from the upper end of separator 16 through passage 28 at a pressure of about 886 pounds per square inch. The moisture-laden desiccant passes downwardly through revivification zone 11 as a substantially compact column. A second minor stream of wet gas charge is passed from conduit 18 through passage 29 at a rate controlled by valve 30 in response to flow rate controller 31. This wet gas stream is passed through a heater 32 wherein the gas is heated to a temperature sufficient to furnish the heat required to vaporize the moisture on the desiccant in revivifier 11, for example, about 360° F. There will be about a 5 pounds per square inch pressure drop across the heater so that the revivification gas will be supplied to the desiccant bed in revivifier 11 at about 895 pounds per square inch gauge and about 360° F. The heated gas passes upwardly through the desiccant and heats it to a temperature sufficient to vaporize the moisture thereon and strip it from the desiccant. Moisture-laden revivification gas is removed from the upper section of revivifier 11 through passage 33 at a pressure of about 893 pounds per square inch and a temperature of about 270° F. This moisture-laden gas is passed downwardly into heat exchanger 34 wherein, by indirect heat exchange with the dry gas from drier 10, its temperature is reduced to about 120° F., thereby condensing most of the moisture picked up in the revivification zone. The temperature of the dry gas is raised thereby to about 107° F. and the pressure reduced to about 879 pounds per square inch by passage through the exchanger before removal from the system. The revivification gas is then passed through scrubber 35 wherein the condensed moisture is removed from the gas and discarded from the system through passage 36. The revivification gas, which is still at least as wet as the charge gas, is removed from the scrubber through passage 37. The lift gas is combined with the revivification gas and both pass into the lower section of drier 10. The pressure of entry to the drier will be about 886 pounds per square inch gauge and the temperature about 110° F. The hot, dry desiccant passes downwardly from the lower section of the revivification zone into the upper section of the drying zone to supply the bed therein through seal leg 12 of restricted cross-section. The rate of desiccant circulation through the system and the rate of wet gas charge to drier 10 are both controlled, so that the ratio of the specific heat capacity of the wet gas charge to the drier, including lift gas and revivification gas, to the specific heat capacity of the desiccant supplied is at least about 1.01, and preferably at least 1.10, so that the desiccant will be cooled to a temperature suitable to effect dehumidification of the wet gas within the upper 12 inches of the bed and preferably within the upper 2 inches thereof. Thus, under the conditions given above, with desiccant entering the drier at about 360° F., the temperature of the desiccant should be reduced to at least 100° F. within the upper 2 inches of the bed. Of course, the wet gas must be supplied to the drier at a temperature below the desired drying temperature. Generally, the wet gas should be supplied at a temperature 3° F., and preferably 10° F. therebelow. The temperatures at which most gas streams are available for drying will normally meet this requirement. By this system the use of external cooling to remove the heat required to revivify the desiccant is avoided. Also, the heat of adsorption of moisture on the desiccant is removed by the gas stream flowing through the drier. Since the relative rates of the desiccant and wet gas streams are adjusted so that the cooling is accomplished in relatively few inches of the bed, there is little height added to the unit by the cooling requirements.

It will be noted in the process shown in Figure 1 that the gas passes between the various zones without the use of intermediate compressors or blowers. This is accomplished by maintaining the revivifier at a pressure above the drier and adjusting pressures throughout the system to obtain the proper flow at each point. Thus, in Figure 1, the gas is supplied to the revivifier at a pressure as close as possible to the pressure of wet gas charge through pipe 18 consistent with the necessity of passing the gas through heater 32. The pressure of the effluent gas from the revivifier after cooling and scrubbing will, of course, be fixed once the pressure in the revivifier is fixed. Pressure reduction valve 20 is then set to provide the pressure in passage 19 beyond valve 20 at about the same value as that in conduit 37. The admission of gas to the lift tank 14 is controlled by valve 26 at a rate which will provide the desired degree of desiccant circulation and thus, necessarily, the rate of gas admission to tank 14 is such that the pressure in line 28 is about the same as the pressure in conduit 37. Thus, all three streams of wet gas will enter drier 10 and flow upwardly therethrough without use of a compressor. Of course, valve 38 on the dry gas outlet line is set for an outlet pressure low enough to cause this flow. The dry gas produced by the process will be at a lower pressure than the wet gas charge, but for most applications, such as natural gas drying, this will not matter. This process for adjusting the pressures at the various points in the system to avoid recompression of the gas is the subject of claim in U. S. patent application 316,455, filed October 23, 1952.

An alternative method of operating the process of Figure 1 is to by-pass heater 32 in line 29 by means of by-pass 39. The heat required to vaporize the moisture on the desiccant would then be supplied by circulating a suitable heating fluid through heating coils 40 in revivification zone. Utilizing this system, under the assumed conditions of wet gas charge at 900 pounds per square inch gauge and 96° F., a portion of the wet gas would be supplied to the lower section of the revivifier at about the same pressure and temperature as the wet gas is supplied to the process. Gas would be removed from the revivifier at 898 pounds per square inch gauge and 270° F., and after cooling and scrubbing would be passed into the lower section of the drier at about 891 pounds per square inch gauge and 120° F. The portion of the wet gas charge passed directly to the drier through passage 19 would first be reduced in pressure to about 891 pounds per square inch gauge. The dry gas at the top of the drier would be at 889 pounds per square inch gauge and 100° F., and after passage through the heat exchanger 34 would be at 884 pounds per square inch gauge and 107° F.

Also, in Figure 1, the revivification gas may be some gas other than the wet gas charge, such as flue gas or methane, admitted through passage 41 while keeping passage 29 closed. This gas may be heated before it is supplied to revivifier 11 or the required heat may be supplied by means of heating coils 40.

Figure 2 illustrates a less preferred form of this invention wherein the drier is operated at a higher pressure than the revivifier, so that the revivification gas must be compressed before passing it through the drier.

Turning to Figure 2, there is shown therein revivifier 11 positioned above drier 10 with granular desiccant transported from the bottom of the drier to the top of the revivifier by means of conduits 13 and 17 and lift pipe 15, as described in connection with Figure 1. Wet natural gas, for example, at 900 pounds per square inch gauge and 96° F., is supplied to the system through conduit 18. A major portion of this gas is passed directly to the lower section of the drier 10 through passage 50, so that the pressure and temperature there will be the same as the wet gas charge. The wet gas is dried in the same manner as described in connection with Figure 1. The dry gas is removed from the upper section of drier 10 at a pressure of about 898 pounds per square inch gauge and at a temperature of about 100° F. through passage 51. Most of this gas is removed from the process through passage 52 as product. Some of this dry gas, however, is passed through conduit 53 at a rate controlled by valve 54. This gas passes through heater 55 wherein the temperature of the gas is elevated to a level sufficient to strip moisture from the moisture-laden desiccant in the revivifier 11, for example, 360° F. At this temperature and at a pressure of about 892 pounds per square inch gauge, this gas is supplied to the revivifier through passage 56 as revivification gas to strip moisture from the desiccant therein. Moisture-laden gas is removed from the upper section of revivifier 11 through passage 57 at a pressure of about 890 pounds per square inch gauge and a temperature of 270° F. Under one mode of operation, this gas is compressed to about 907 pounds per square inch by means of a compressor 58 and then passed through cooler 59 wherein the temperature of the gas is reduced to about 120° F. and water condensed therefrom. The cooled gas is passed to separator 60 where water settles out of the gas and is removed from the system through passage 61. The gas is then removed from the upper section of separator 60 at a pressure of about 900 pounds per square inch gauge and at 120° F. and passed through conduits 62 and 50 into the lower section of drier 10. Alternatively, the compressor 58 may be by-passed through conduit 63 and the revivification gas removed from the system through passage 64, rather than being returned to drier 10. This gas may be blended with the dry gas from passage 52 if the resultant mixture is within the desired moisture limitations. In this system, also, a separate revivification gas may be used rather than using a portion of the dry gas. This gas may be admitted through passage 65. In the process of Figure 2, as in the process of Figure 1, the relative wet gas and desiccant charge rates to drier 10 are adjusted to make the ratio of the specific heat capacity of the gas stream to the specific heat capacity of the desiccant charge stream at least about 1.01, and preferably at least about 1.10, thereby effecting cooling of the desiccant from the revivification zone to a temperature suitable for drying the wet gas to the desired extent within the upper 12 inches of the desiccant bed in the drier. This would be a cooling from about 360° F. to about 100° F. under the conditions assumed in this description. A portion of the wet gas charge is used as a lift gas in the process of Figure 2 in much the same manner as it was in the process of Figure 1. The effluent lift gas from separator 16 which exits through conduit 66 may be blended back with dry gas from the drier if tolerable moisture limits are not exceeded, or it may be passed back to the drier with effluent gas from the revivifier. To accomplish this latter, the lift gas should be supplied to conduit 57 on the intake side of compressor 58 at a pressure about equal to that in the upper section of the revivifier.

Figure 3 illustrates another form of the process of this invention. In Figure 3, the drier 10 is above the revivifier 11. In one operation the wet natural gas at 900 pounds per square inch gauge and 96° F. is supplied at 18 and split into three portions. A major portion flows directly into drier 10 through passage 70, so that the pressure and temperature in the bottom of the drier will be about the same as the pressure and temperature at which the wet gas enters the system. The wet gas passes upwardly through the compact bed of desiccant therein and is dried to the desired degree. Dry gas is removed through conduit 22 at a pressure of about 898 pounds per square inch gauge and a temperature of about 100° F. Moisture-laden desiccant passes into the upper section of the revivifier 11 from the lower section of drier 10 through seal leg 12. A second portion of wet gas charge passes from conduit 18 into passage 71 at a rate controlled by valve 72. This gas is elevated in pressure to a level at which gas will flow from revivifier to drier without further compression, for example, about 914 pounds per square inch gauge by compressor 73. When wet charge gas is used as revivification gas valve 74 in line 75 is kept closed. The revivification gas is then passed through heater 76 wherein its temperature is elevated to a level suitable for revivifying the desiccant, for example, about 360° F., and the heated gas, now at a pressure of about 909 pounds per square inch gauge, is passed into the lower section of the revivifier 11. The revivification gas passes upwardly through the desiccant in the revivifier and strips the moisture therefrom. The moisture-laden revivification gas, at 907 pounds per square inch gauge and 270° F., is removed through passage 77 and moisture condensed by condenser 78. Moisture is separated from the gas in separator 79 and the gas now at 900 pounds per square inch gauge and 120° F. passed through conduit 80 into conduit 70 and then into the lower end of drier 10. Hot, dried desiccant at about 360° F. passes from revivifier 11 through passage 13 into lift tank 14. A third portion of wet gas charge passes through conduit 81 at a rate controlled by valve 82 and enters lift tank 14 at 900 pounds per square inch gauge and 96° F. This gas transports the hot desiccant upwardly through lift pipe 15 to separator 16. During the transportation heat exchange occurs between gas and desiccant so that some cooling of the desiccant occurs. The desiccant is not cooled completely to a temperature suitable for drying the wet gas, however. Under the conditions assumed here, the desiccant might be cooled to about 125–150° F. The desiccant then gravitates into drier 10 through passage 17 and the cooling completed in the upper section of the bed by adjusting the wet gas and desiccant flow rates as previously described. The lift gas is removed from the system through passage 83 at about 898 pounds per square inch gauge and 125–150° F. Alternatively, the lift gas may also be used as revivification gas by opening valves 84 and 74 in line 75 and closing valve 85 in line 71. This may only be done, of course, when the quantity of lift gas and the quantity of revivification gas required are about the same. The lift gas from separator 16 passes from conduit 83 into passage 75 and is compressed by compressor 86 to the required pressure, for example 914 pounds per square inch gauge. The gas then passes into passage 71 to be used in the manner previously described. The relative rates of desiccant and wet gas supply to the drier are controlled, so that the desiccant is cooled to a temperature suitable for the desired degree of adsorption within the upper 12 inches of the bed. It will be noted that in the process of Figure 3, the desiccant is not cooled completely from its revivification temperature to a suitable drying temperature in the upper end of the desiccant bed in the drier, but rather only part of the cooling occurs at this point with the remainder occurring in the gas lift. However, a substantial portion of the cooling is still effected in the upper 12 inches, and preferably 2 inches of the desiccant bed.

As previously stated, in all forms of this invention the desiccant circulation rate is adjusted so low relative to the wet gas charge rate to the drier, that the specific heat capacity of the desiccant, that is, the heat required per unit time to lower or raise the temperature of the desiccant stream one degree in temperature, is substantially less than the specific heat capacity of the wet gas stream. Thus, the temperature at which the wet gas is supplied to the drier controls the temperature of the desiccant bed in the drier. The ratio of the specific heat capacity of the wet gas stream charged to the drier to the specific heat capacity of the desiccant stream supplied to the drier should be at least about 1.01, and preferably at least about 1.10. The wet gas should be charged to the drier at a temperature 3° F., and preferably 10° F. below the desired average temperature of the desiccant bed.

The temperature to which the desiccant must be cooled to provide for efficient moisture removal and the average temperature of the desiccant bed in the drier will vary widely with the particular gas charge, the particular desiccant and the degree of dehumidification desired. Generally, for petroleum natural gas drying, the desiccant should be cooled to about 120° F. to 60° F. in the upper 12 inches, and preferably 2 inches of the bed in the drier. Preferably, this cooling should be to a temperature within the range 60° F. to 100° F. The average bed temperature for natural gas drying should be within the range about 60° F. to 120° F., and preferably 60° F. to 100° F. The temperature to which the desiccant must be heated in the revivification zone will also vary considerably with the particular desiccant used. Generally, however, a temperature within the range 300° F. to 500° F., and preferably 350° F. to 400° F. must be used. The space velocity of the wet gas in the drying zone should be within the range about 200 to 2000 volumes of gas measured at the desiccant bed temperature and pressure in the drier, per volume of desiccant bed per hour.

As an example of the operating conditions of this invention, the drying of a wet natural gas stream amounting to 68 million standard cubic feet per day by a process similar to that of Figure 1 will be considered. The wet gas is available at 900 pounds per square inch gauge and at 96° F. In a suitable design to reduce the water content of this wet gas from 54 pounds per million cubic feet to 7 pounds per million cubic feet by means of commercial Sovabead desiccant, the drier was 6 feet in diameter and 12 to 13 feet high. The desiccant bed in the drier was only 5 to 6 feet in depth. The revivifier was 3 feet in diameter and had a desiccant bed about 4 feet deep therein. The desiccant was circulated through the system at a rate of about 0.8 ton per day. Of the 68 million cubic feet per day wet gas charge, 63.6 million cubic feet are passed directly to the drier. About 2.4 million cubic feet are used as revivification gas being heated to about 360° F. before being supplied to the revivifier. The remaining 2 million cubic feet are used as lift gas. In general, the temperatures and pressures given in conjunction with Figure 1 are representative of the temperatures and pressures at various points in the system under the conditions of this example. Hot, dry desiccant would be removed from the revivifier at about 360° F. and cooled to about 100° F. in the upper 2 inches of the desiccant bed in the drier.

It should be understood that it is intended to cover herein all changes and modifications of the examples of the invention chosen herein for purposes of disclosure which do not constitute departures from the spirit and scope of the invention.

I claim:

A continuous process for the dehumidification of wet natural gas, which comprises: maintaining a confined revivification zone above a confined drying zone, maintaining a downwardly gravitating, substantially compact bed of granular desiccant within the confined drying zone, passing a first stream of wet natural gas directly into the lower section of said drying zone and upwardly through said bed to effect removal of moisture from the gas by desiccant and removing the dried natural gas from the upper section of the drying zone, removing moisture-bearing desiccant from the lower section of the bed in the drying zone and suspending the desiccant after removal in a second stream of wet natural gas charge, elevating said suspended desiccant to a separation zone in which the suspended desiccant is separated from the second natural gas stream, removing the second wet natural gas stream from the separation zone and passing the second wet gas stream into the lower section of the drying zone to pass upwardly therethrough and be dried, gravitating moisture-laden desiccant from the lower section of the separation zone into the upper section of the revivification zone, passing the moisture-laden desiccant through the revivification zone as a downwardly gravitating, substantially compact bed, heating a third stream of wet natural gas charge to a temperature suitable to effect revivification of the desiccant and passing said heated gas through the bed in the revivification zone to revivify the desiccant by stripping it of moisture and by heating the desiccant to a suitable temperature substantially above the temperature at which the desiccant adsorbs moisture, removing said third wet gas stream from the upper section of the revivification zone and cooling said gas to condense the moisture picked up in the revivification zone therefrom, passing said third gas stream after said cooling into the lower section of the drying zone to effect drying thereof, gravitating hot revivified desiccant without substantial intermediate cooling into the upper section of the drying zone and discharging said hot desiccant on the desiccant bed therein, maintaining the rate of natural gas supply to the lower section of the drying zone and the rate of circulation of the desiccant such that the ratio of the specific heat capacity of the natural gas supplied to the drying zone to the specific heat capacity of the desiccant supplied to the drying zone is at least 1.01, and the hot desiccant supplied to the drying zone is cooled within the upper 12 inches of the bed in the drying zone to a temperature suitable for removing moisture from the wet natural gas to the desired extent.

References Cited in the file of this patent

UNITED STATES PATENTS

| 1,948,779 | Abbott et al. | Feb. 27, 1934 |
| 2,359,660 | Martin et al. | Oct. 3, 1944 |
| 2,493,911 | Brandt | Jan. 10, 1950 |
| 2,549,104 | Lechthaler | Apr. 17, 1951 |
| 2,568,379 | Berg | Sept. 18, 1951 |
| 2,616,521 | Berg | Nov. 4, 1952 |
| 2,629,460 | Maki | Feb. 24, 1953 |
| 2,630,877 | Berg | Mar. 10, 1953 |
| 2,636,575 | Watson | Apr. 28, 1953 |
| 2,638,999 | Berg | May 19, 1953 |
| 2,642,955 | Huntington et al. | June 23, 1953 |
| 2,665,769 | Walker et al. | Jan. 12, 1954 |